United States Patent [19]

Kometani et al.

[11] 3,960,651

[45] *June 1, 1976

[54] REINFORCED AIR-PERVIOUS POLYTETRAFLUOROTHYLENE SHEET

[75] Inventors: Yutaka Kometani; Shun Koizumi, both of Toyonaka; Kazuo Kubota, Sulin; Takeaki Nawazima, Toyonaka, all of Japan

[73] Assignee: Daikin Kogyo Co., Ltd., Osaka, Japan

[ * ] Notice: The portion of the term of this patent subsequent to Sept. 15, 1987, has been disclaimed.

[22] Filed: Aug. 16, 1973

[21] Appl. No.: 388,724

Related U.S. Application Data

[60] Continuation of Ser. No. 154,606, June 18, 1971, abandoned, which is a division of Ser. No. 35,285, May 6, 1970, Pat. No. 3,629,383, which is a continuation-in-part of Ser. No. 403,367, Oct. 12, 1964, Pat. No. 3,528,879.

[52] U.S. Cl. .............................. 162/105; 162/108; 428/256; 428/421
[51] Int. Cl.² ............................................ B32B 15/02
[58] Field of Search .............. 161/89, 189; 162/104, 162/105, 108; 264/127; 428/256, 421

[56] References Cited
UNITED STATES PATENTS

| | | | |
|---|---|---|---|
| 2,710,991 | 6/1955 | Squires | 264/273 X |
| 2,772,444 | 12/1956 | Burrows et al. | 264/127 |
| 2,936,301 | 5/1960 | Thomas et al. | 264/115 X |
| 3,003,912 | 10/1961 | Harford | 162/157 R |
| 3,015,604 | 1/1962 | Hochberg | 162/157 R |
| 3,186,897 | 6/1965 | Hochberg | 264/127 X |
| 3,528,879 | 9/1970 | Kometani et al. | 162/157 |

FOREIGN PATENTS OR APPLICATIONS

| | | | |
|---|---|---|---|
| 639,568 | 4/1962 | Canada | 264/127 |

*Primary Examiner*—William J. Van Balen
*Assistant Examiner*—Henry F. Epstein
*Attorney, Agent, or Firm*—Sherman & Shalloway

[57] ABSTRACT

An air-pervious sheet predominantly of polytetrafluoroethylene, the sheet being reinforced by being fused to a liquid-pervious reinforcing material layer which is capable of retaining its original form even when heated to a temperature of 270° to 280° C. The sheet preferably consists of a polytetrafluoroethylene fibrous powder having an average fiber length of 100 to 5,000 microns, an average shape factor of not less than 10, and an anisotropic expansion factor of 1.30 to 7.00 adhered by means of molten polytetrafluoroethylene having an average particle diameter of 0.05 to 0.5 microns to a liquid-pervious reinforcing material layer which is capable of retaining its original form even when heated to a temperature of 270° C. to 380° C.

1 Claim, No Drawings

REINFORCED AIR-PERVIOUS POLYTETROFLUORETHYLENE SHEET

This application is a continuation of Ser. No. 154,606, filed June 18, 1971, now abandoned, which was a division of Ser. No. 35,285, filed May 6, 1970, now U.S. Pat. No. 3,629,383, which was a C.I.P. of Ser. No. 403,367, filed October 12, 1964 now U.S. Pat. No. 3,528,879.

The present invention relates to paper and airpervious cardboard or boardlike structures predominantly of polytetrafluoroethylene, which have been reinforced with an airpervious reinforcing material layer; and to a process for making the same.

Although a number of inventions have been made concerning the process for producing filter material of polytetrafluoroethylene, each has its drawbacks and none has come to be widely practiced.

Of the prior art processes, that being practiced most frequently is the process in which polytetrafluoroethylene is mixed with either a crystalline salt powder or metallic powders of copper, iron, aluminum, etc., the mixture then preformed by compressing in a metallic mold, followed by sintering the preform at above 327° C. and thereafter dissolving and removing the admixed salt or metallic powders. Another process is that in which naphthalene powder is mixed in, then after vaporizing the mixture at below the melting point of the resin, sintering is carried out. The molding step in either of these processes is complicated, and not only is there the drawback that the additives are not completely eliminated but such processes also have the defect that their strength, especially flexal strength, is small. Further, because of their complexity, such processes of necessity become expensive. It is also known to make filter cloth by weaving into a fabric the polytetrafluoroethylene fiber obtained by the process disclosed in U.S. Pat. No. 2,772,444. A filter cloth such as this is very expensive, however, and can only be used for special purposes.

Another known process is that in which the colloidal particles of polytetrafluoroethylene to which has been added a lubricant are extruded from a fine nozzle to produce rods or tubes, following which these are cut into pieces 6 – 25 mm long, then an abrasive force is applied to render them fibrous, after which this fibrous product is pulped by placing in water or water to which a surfactant has been added and thereafter made into a paper product (U.S. Pat. No. 3,003,912). In this process, however, it should be self-evident that thin papers cannot be made, since the length of the fibers used is long. Even when thicker sheets are to be made, it is necessary to run the sheets through a calendar roll several times to remove the non-uniformity in the thickness of the sheets. At times, however, an unnecessary amount of interlacement between the fibers occurs which results in the density becoming too excessive, with the consequence that air-permeability is lost. In addition, since the so-called paste extrusion is carried out during the course of producing the fibers, this results in setting up in the fibers molecular orientation to a high degree, which orientation is relaxed at above the melting point causing undesirable shrinkage to take place during the sintering step. This shrinkage not only increases the thickness of the paper but becomes the cause of non-uniformity in thickness as well. Further, since extrusion is carried out during the fiber-making step according to this process, the product becomes an expensive filter material.

Strong paper of a thinness less than 200 grams per square meter and air-pervious, pliable cardboard or boardlike structures of polytetrafluoroethylene could not be made economically to advantage by these prior art processes. Further, a filter material predominantly of polytetrafluoroethylene, which has good properties and is of low cost, was not known.

As a result of extensive experimentation, we found that the thin paper and cardboard or boardlike structures of polytetrafluoroethylene, as contemplated by the present invention, could only be made by using as the starting material the polytetrafluoroethylene fibrous powder having an average fiber length of 100 – 5,000 microns, an average shape factor of not less than 10 and an anisotropic expansion factor of 1.30 – 7.00; and further that this special fibrous powder could be made into paper and cardboard or boardlike structures by the process hereinafter described.

The terms "average fiber length" and "average shape factor," as used herein, denote, respectively, the arithmetical average of the lengths of 200 or more fibers observed optically when said powder is examined under a microscope and an arithmetical average of 200 or more shape factors which is obtained by dividing the fiber length by its width. In measuring the fiber lengths from the photomicrographs, those of fiber length not exceeding 80 microns are excluded. Since the average according to this measurement method is a number average, should those fibers not exceeding 80 microns, the proportion by weight of which are very small, be added to the number average, it will result in evaluating unjustifiably low the fiber length obtained, thus becoming a value far different from the actual fiber length.

The term "anisotropic expansion factor" is determined by the following method: Four and one-tenth grams of powder is weighed into a 0.5 inch square metallic mold where it is subjected at 23° C. to a pressure raised to 2,000 p.s.i. during one minute, after which it is held at this pressure for 2 minutes. The length, width and height of the resulting roughly cubical preform are measured (i.e., the X, Y and Z axes, respectively, where Z axis is the direction in which the preforming pressure was applied). The measured preform is sintered for 30 minutes at 380° C. ± 0.5° C., followed by allowing the resulting sintered product to cool in air to room temperature, after which it is remeasured. The anisotropic expansion factor is then the value of $Z_s/Z_p$ divided by $(X_s + Y_s)/(X_p + Y_p)$, where $X_p$, $Y_p$, $Z_p$ are the respective axial measurements of the preformed product, while $X_s$, $Y_s$ and $Z_s$ are the axial measurements of the sintered product.

Unless the particles are fibrous, the interlacement that occurs between fibers does not take place and hence, good quality paper cannot be made. Namely, the powder which heretofore was readily available commercially was in nearly all cases not fibrous, with the consequence that paper and cardboard could not be made. Since the average shape factor is a factor which numerically expresses the extent of the fibrous state, the interlacement does not occur to a substantially full extent when this factor is less than 10.

However, even though the powder may be of fibrous form, if its fiber length is less than 100 microns, the length of the fiber is too short and hence, in this case also it cannot be made into paper, as the interlacement between the fibers is insufficient. As commercially availlable powders of this grade, there is one which has an average particle diameter of 35 microns, a shape factor of 8–112 and an anistropic expansion factor of 1.18. As a practical matter, a paper cannot be made from this powder however. While this is due to the fact that its shape factor is small and the extent of its fibrousness is small, there is also the following reason, namely, since the average fiber length of this powder is less than 100 microns, when paper is made from its dispersion, it does not become paper-like because of the lack of interlacements between the fibers.

On the other hand, when the powder has an average fiber length exceeding 5,000 microns, it is not suited for making thin but strong paper and cardboard that are uniform, even though the other properties, including the shape factor and anisotropic expansion factor, are within the limits prescribed by this invention, namely, when it exceeds 5,000 microns the irregularity in the surface of paper made therefrom is pronounced. That is to say, when the fiber length is great, the diameter of the fibers becomes large, thus making it impossible to make thin and uniform papers. A process for producing this type of fiber is disclosed in the previoulsy mentioned U.S. Pat. No. 3,003,912. However, while the fibers obtained by this process can, with some entailing difficulty, be formed into air-previous cardboard and sheets, they could not be made uniform since the fiber length of the powder was greater than 5,000 microns, and hence there was spottiness in the strength of the products obtained. Further, it was not at all possible to make thin papers of less than 200 grams per squae meter.

Further, the powder becomes unfit for making uniform thin papers, cardboard and sheets when its anisotropic expansion factor is not less than 7.00, even though its other properties fall within those prescribed by the present invention, namely, the anisotropic expansion factor is a measure of the molecular orientation in the fiber. Hence, as the molecular orientation increases, the anisotropic expansion factor becomes greater. If the molecular orientation is great, the shrinkage of the fiber at above the melting point of polytetrafluoroethylene is inevitably great, and in consequence spottiness in the thickness of the product results because of the great shrinkage in the paper during its sintering step.

When the anisotropic expansion factor is less than 1.30, the form of the powder is either nonfibrous or not completely fibrous, and thus, since interlacement does not take place between the particles of the powder, it cannot be made into paper.

According to the present invention, a polytetrafluoroethylene fibrous powder having an average fiber length of 100 – 5,000 microns, an average shape factor of not less than 10 and an anisotropic expansion factor of 1.30 – 7.00 is weighed, to which is then added on a weight basis fivefold or more of an aqueous medium whose surface tension at 25° C. is 40 dynes per centimeter, and preferably below 35 dynes per centimeter as through the use of a suitable surfactant, e.g., alkylarylethylene glycol.

The reason why the surface tension must be below 40 dynes per centimeter, and preferably below 35 dynes per centimeter, is because the specific surface area of the fibrous powder used in this invention is ten times that of the fibers according to the conventional processes. For example, the specific surface area, as obtained by nitrogen adsorption, of the fibers used in making the two hereinbefoe described conventional filter materials is 0.05 – 1.0 m$^2$/g, whereas that of the present invention is 0.5 – 3 m$^2$/g. Hence, since the invention powder is more susceptible as a whole to surface tension than the other fibers, it is difficult to wet with liquids. Therefore, if a liquid of great surface tension is used, the fibers would float and it would be impossible to form a uniform paper web.

When using water as the dispersion medium by lowering its surface tension by adding a surfactant thereto, it was found that instead of using it as such, still better results could be obtained by using it mixed with 0.5 – 40% by weight of either polytetrafluoroethylene particles or tetrafluoroethyleneperfluoroolefin ($CF_2$ - $CFR_f$ where $R_f$ is a radical consisting of a carbon atom and fluorine atom) copolymeric particles whose average particle diameter is 0.05 – 0.5 micron, or the mixture thereof, as hereinafter described.

In making paper using the so obtained dispersion, the conventional paper-making machines, particularly the paper-making machins which are manually operated such as the TAPPI type can be used without change or with only minor modifications.

The paper web which has been merely dried cannot be used in this state, since the bonding between the fibers is not sufficiently strong. But by heating this dried web, a paper product having sufficient strength can be obtained. As there is a tendency toward shrinkage occurring in the fibers as the sintering temperature becomes higher, a temperature of below 360° C. is preferably employed.

As hereinbefore described, in making paper and air-pervious cardboard or boardlike structures, predominantly of polytetrafluoroethylene, although basically the process comprises dispersing a polytetrafluoroethylene fibrous powder having an average fiber length of 100 – 5,000 microns, an average shape factor of not less than 10 and an anisotropic expansion factor of 1.30 – 7.00, in an aqueous medium of below 40 dynes per centimeter, then forming a web using this dispersion and thereafter heating the formed web with or without application of pressure, the present invention comprehends several more valuable embodiments. For example, paper and air-pervious cardboard or boardlike structures predominantly of polytetrafluoroethylene can be made by dispersing a polytetrafluoroethylene fibrous powder having an average fiber length of 100 – 5,000 microns, an average shape factor of not less than 10 and anisotropic expansion factor of 1.30 – 7.00, and 0.2 – 50 percent by weight of a thermoplastic resin powder, in an aqueous medium having a surface tension at 25° C. of below 40 dynes per centimeter, and preferably below 35 dynes per centimeter, then after forming a web using this dispersion, either heating the web formed to above the melting or softening point of the thermoplastic resin incorporated or heating the web after pressing or hot pressing the web.

The thermoplastic resin preferred for dispersing with the polytetrafluoroethylene fibrous powder include the polytetrafluoroethylene powers having a wet:sieve size of less than 500 microns, tetrafluoroethylene-hexafluoropropylene copolymer powder, polyethylene powder, polyvinyl chloride powder, polypropylene powder, trichlorotrifluoroethylene powder, polyacetal powder, the fluoride copolymer powder, polyvinylldene chloride powder, vinyl chloride-vinylidene chloride copolymer powder, ethylenepropylene copolymer powder, or the particles of polytetrafluoroethylene and/or copolymers of tetrafluoroethylene-perfluoroolefin whose particle diameter if 0.05 – 0.5 micron, as hereinbefore noted. Particularly, when the polytetrafluoroethylene powder of a wetsieve size less than 500 mirons or the tetrafluoroethylenehexafluoropropylene copolymer powder is used, since it is possible to make paper and cardboard or boardlike structures having great strength without impairing whatsoever the various properties of the predominant polytetrafluoroethylene, such as its excellent heat resistance and resistance to chemicals, the use of these powders give especially remarkable results. On the other hand, in the case of thin paper and air-pervious cardboard or boardlike structures predominantly of polytetrafluoroethylene for use in making articles not requiring heat resistance and resistance to chemicals, for example, speaker cones, the conjoint use of a resin of low melting or softening point makes possible the production of boardlike structures economically.

While, as the polytetrafluoroethylene powder to be conjointly used, any will do as long as it is a powder of a wetsieve size less than 500 microns particularly preferred are such as the finely divided powders obtained by grinding in the "Ultramizer" (a product of Fuji Electric Works Co. Ltd., Japan) either the "fine powder" obtained by coagulating an aqueous dispersion of colloidal polytetrafluoroethylene obtained by emulsion polymerization, the commercial grade polytetrafluoroethylene powder, or the powder obtained by the polymerization in the vapor phase of tetrafluoroethylene at 3 – 10 atmospheres and 0° – 40° C. in the presence of water containing a reaction initiator of free radicals; or the finely divided powder obtained by grinding the commercial grade polytetrafluoroethylene molding power (normally of particle diameter 300 – 1,000 microns) in the "Micron Mill" (product of Hosokawa Iron Works Ltd., Japan) or "Jet-O-Mizer."

While it may seem strange that the strength is increased when, as in this case, granular powder of the same type of substance is added and mixed with polytetrafluoroethylene fibrous powder, this fact has been made known for the first time by means of this invention.

The fibrous powder having an average fiber length of 100 – 5,000 microns, an average shape factor of not less than 10 and an anisotropic expansion factor of 1.30 – 7.00 differs in its melting temperature of the crystals and shrinkage temperature of fibers, the latter being higher. The melting point of the polytetrafluoroethylene granular powder is the same as that of the melting temperature of the crystals of fibrous powder, and since the powder becomes completely gelled at above the melting point, the intimate bonding between the fibrous powder is effected to increase the strength of the product if it is sintered above the melting temperature of the crystal but at a temperature which does not change the form of the fibrous powder. Further, since the melting point of the tetrafluoroethylene-hexafluoropropylene copolymer is lower than that of polytetrafluoroethylene, it becomes a good binder, with the consequence that the strength of the molded product is enhanced. Thus, even the fibrous powder having an anisotropic expansion factor of above 1.30 and below 7.00, which could not have been molded by the prior art processes unless much care was exercised in its sintering can now be readily molded into thin paper and cardboard or boardlike structures by its conjoint use with the various thermoplastic resin powders, and particularly with the polytetrafluoroethylene powder having an average particle diameter below 500 microns or the tetrafluoroethylene-hexafluoropropylene copolymer powder. 170

While the strength of the resulting paper or cardboard and boardlike structure will be increased in concomitance with an increase in the amount of the conjointly used powder, the airpermeability or the filtration speed is decreased. Thus, the conjoint use of a powder such as, for example, of polytetrafluoroethylene or the tetrafluoroethylene-hexafluoropropylene copolymer plays the role of a regulator of air-permeability.

It accordingly becomes necessary to increase or decrease the amount of the conjointly used powder depending upon the purpose to which the resulting molded product is to be put. When a paper of great air-permeability of filtration speed is required, the conjointly used powder in an amount of 1 – 15 percent by weight is suitable, but, on the other hand, when one is required which is strong though its air-permeability is small, the amount suitably used is 15 – 50 percent by weight. An amount ranging between 0.2 and 50 percent by weight is chosen depending upon the strength and air-permeability desired in the product.

The method of making conjoint use of a powder may be that in which the powder to be conjointly used is added after the fibrous powder has been dispersed in the aqueous medium or that in which the fibrous powder and the powder to be conjointly used are mixed in a dry type mixer, etc.

We also found that good quality paper and air-pervious cardboard or boardlike structures predominantly of polytetrafluoroethylene could be made by dispersing a fibrous powder having an average fiber length of 100 – 5,000 microns, an average shape factor of not less than 10 and an anisotropic expansion factor of 1.30 – 7.00, in an aqueous medium containing 0.5 – 40 percent by weight of particles of polytetrafluoroethylene and/or a tetrafluoroethylene-perfluoroolefin copolymer ($CF_2$ - $CFR_f$ where $R_f$ is a radical consisting of carbon and fluorine) whose average particle diameter is 0.05 – 0.5 micron, then using this dispersion to form a web, and thereafter heating the web at above 270° C. under atmospheric or superatmospheric pressures.

The particles used in this instance consisting of that of polytetrafluoroethylene or a copolymer of tetrafluoroethylene and perfluoroolefin ($CF_2$ - $CFR_f$ where $R_f$ is a perfluoroalkyl radical) of which the average particle diameter is below 0.5 micron can be obtained readily as an aqueous, colloidal dispersion by the emulsion polymerization according to customary procedures of tetrafluoroethylene alone or as a mixture in optional proportions of tetrafluoroethylene and perfluoroolefin in the presence of water, using an emulsifier and a polymerization initiator of free radicals. Further, the commercial grade polytetrafluoroethylene dispersion or the fluoroethylene-propylene copolymer dispersion in which $C_3F_6$ has been used as a copolymer constituent, are conveniently useable. These dispersions normally contain several percent of a surfactant and thus can be used as such for making the paper as contemplated by this invention; however, since their content of resin is great and as a result they yield products lacking in pores, they are preferably used diluted with water or an ion-exchanged water.

The 0.05 – 0.5 micron polytetrafluoroethylene or tetrafluoroethylene-pefluoroolefin copolymer contained in the aqueous dispersion used in the present invention can be used in any concentration provided it is between 0.5 and 40 percent by weight. Naturally, the paper and cardboard or boardlike structures obtained by forming the fibrous powder into a web using a dispersion containing a great amount of resin will become relatively dense and the surface of such a paper, cardboard and boardlike structure will be smooth and have a good touch. Conversely, when the web is formed using a dispersion whose content of resin is small, the product obtained will be one having great air-permeability. Hence, the choice of the concentration of dispersion will be decided in accordance with the use to which the final product is to be put.

The addition in this manner of a small amount of the aforesaid dispersion in the dispersion in which the fibrous powder has been dispersed has the effect of enhancing the luster of the surface of the paper or cardboard and of also increasing their strength somewhat. Thus, it becomes possible either to omit the step or reduce the time required for finishing the product by means of rolls following the formation of the web and heating.

Another advantage in connection with the use of the dispersion of 0.5 – 0.05 micron polytetrafluoroethylene and/or tetrafluoroethylene-perfluoroolefin copolymer is that when this dispersion medium to which has been dispersed the fibrous powder having an average fiber length of 100 – 5,000 microns, an average shape factor of not less than 10, an anisotropic expansion factor of 1.30 – 7.00 is used and is formed into a web above a liquidpervious reinforcingmaterial layer which can retain its original form even though heated to 270° – 380° C., and thereafter the web formed is heated along with the reinforcing material layer at a temperature of 270° – 380° C under atmospheric or superatmospheric pressure, the production of reinforced paper and liquid-pervious cardboard or boardlike structures predominantly of polytetrafluoroethylene is possible.

The paper and liquid-pervious cardboard or boardlike structures predominantly of polytetrafluoroethylene obtained from the fibrous powder thereof having an average fiber length of 100 – 5,000 microns, an average shape factor of not less than 10 and an anisotropic expansion factor of 1.30 – 7.00, alone or in a state in which it contains a small amount of a thermoplastic resin powder by forming into a paper web and sintering exhibit excellent performance as filter material at low pressures, but when used at high pressures, for example, in separating water contained in gasoline, they encounter trouble with respect to their bursting strength.

Now, however, when in accordance with the present invention the web is formed on top of a liquid-pervious reinforcing material layer which can retain its original form even though heated to 270° – 380° C., such as, for example, a wire screen, metallic wool, glass cloth and glass wool, this defect of the conventional processes can be overcome and thus it is possible to provide improved thin paper and liquid-pervious cardboard and boardlike structures predominantly of polytetrafluoroethylene, which can be used even under high pressures.

Although the 0.05 – 0.5 micron polytetrafluoroethylene and/or tetrafluoroethylene-perfluoroolefin copolymer contained in the dispersion may be in any concentration within the range of 0.5 to 40 percent by weight, an aqueous dispersion containing a greater amount of resin enhances the adhesion of the paper and liquid-pervious cardboard or boardlike structures to the reinforcing material layer. Liquid-permeability, however, declines as the content of the resin increases in the aqueous dispersion. When an aqueous dispersion containing more than 40 percent by weight of the particles of polytetrafluoroethylene and/or tetrafluoroethyleneperfluoroolefin copolymer whose average particle diameter is 0.05 – 0.5 micron is used, the paper and cardboard or boardlike structures will adhere perfectly to the reinforcing material layer, but will become such that it is practically without liquid-permeability, thus rendering it impossible to attain the objects of the present invention.

On the other hand, when the content of resin in the aqueous dispersion is less than 0.5 percent by weight, the paper and cardboard or boardlike structures will not adhere to the reinforced reinforcing material layer at all, or at most imperfectly. Thus, the objects of the invention cannot be achieved.

The following are examples to further illustrated the present invention:

EXAMPLE 1

1 part of polytetrafluoroethylene fibrous powder having an average fiber length of 950 microns, an average shape factor of 38, and anisotropic expansion factor of 5.2, was mixed with 200 parts of polytetrafluoroethylene aqueous dispersion.

A dispersion was prepared by diluting polytetrafluoroethylene dispersion containing about 60 percent by weight of a commercial grade resin with ion exchange water to such a degree that the resin content became 10 percent. As to the said dispersion, the surface active agents of polyoxyethylene, alkylallylether type and alkyl betaine type were respectively added by about 0.3 percent. The surface tension of dispersion at 25° C. was 35 dyne/cm.

The dispersion containing fibrous powder was treated with a TAPPI type paper machine having a diameter of 230 cm, and then it was peeled off from the wire net, was dried, and then sintered at 335° C. in an electric furnace for 20 minutes.

The paper of polytetrafluoroethylene obtained was 180 g/m² thick, and the tensile strength thereof was 18 kg/15 mm. The water permeability was 23 – 25 seconds, and retension properties of precipitates were excellent. The surface of the paper was uniform and there was no unevenness.

EXAMPLE 2

By employing the same operation as in Example 1 (10 percent of resin contained in the dispersion was tetrafluoroethylene-hexafluoropropylene (85 to 15) copolymer), the surface tension of the dispersion at 25° C. was adjusted to 37 dyne/cm and the same surface active agents as employed in Example 1 were used.

The tensile strength of the paper was almost the same, namely, 1.8 kg/15 mm, either in air or in water.

The water permeability was 20 seconds.

The surfaces of the papers obtained in Examples 1 and 2 proved very smooth.

EXAMPLE 3

In Example 1, the amount of polytetrafluoroethylene contained in the dispersion was adjusted to 15 percent, and other operations were so adjusted to be equal to those of Example 1, and thereby the dispersion containing fibrous powder was prepared. In subjecting the said dispersion to the TAPPI type paper machine with a diameter of 230 mm, the dispersion was screened on the carefully placed 200 mesh stainless steel wire net so as not to cause a wrinkle on the wire net of the said paper machine, and almost all the fibrous powder was spread on the stainless steel wire net uniformly, and no powder was recognized on the wire net of the paper machine.

Then the stainless steel wire net was dried with the fibrous power spread over the net, and when they were thereafter sintered at 335° C. for 20 minutes, paper was obtained whose main component was polytetrafluoroethylene which was completely meltadhered to the net.

The water permeability thereof was 80 seconds, and retension properties of precipitates were excellent, and the surface thereof was smooth and uniform.

EXAMPLE 4

This example was substantially identical to Example 3, but in this example tetrafluoroethylene-hexafluoropropylene (85 to 15) copolymer dispersion was employed, and the resin content was adjusted to 20, 0 percent, the surface tension of the dispersion at 25° C. was adjusted to 37 dynelcm by employing the same surface active agent as in Example 3. Instead of the stainless steel wire net used in Example 3, glass cloth was used, and the paper of polytetrafluoroethylene completely melt-stuck to the glass cloth was obtained.

EXAMPLE 5

The paper whose main component was polytetrafluoroethylene reinforced by the wire net obtained in Example 3 was fixed on the bottom of stainless steel cylindrical vessel so as not to have the liquid leak out from the contact surface of the paper and the cylindrical vessel. Then the cylindrical vessel with the paper was set perpendicularly, and a glass receiver was provided at the lower part of the cylindrical vessel.

Then when the mixture of 50 parts of carbon tetrachloride and 50 parts of water was poured from above the said cylindrical vessel, carbon tetrachloride alone passed through the paper whose main component was polytetrafuoroethylene, but water did not pass through.

Similar tests were conducted against gasoline-aqueous mixture, trichlorotrifluoroethane-aqueous mixture, and in either case water stayed at the upper part of the paper whose main component was polytetrafluoroethylene, and did not pass through the filter itself.

The aqueous portion in the solution received in the glass receiver at bottom after passing through the paper was quantitatively analyzed by the Karl Fisher method, and the results as given in Table 1 were obtained:

Table 1

| Tested solution | Aqueous portion before filtration (%) | Aqueous portion after filtration (%) |
|---|---|---|
| carbon tetrachloride | 50 | 0.009 |
| gasoline | 1 | 0.008 |
| trichloro-trifluoroethane | 30 | 0.009 |

The paper, cardboard and boardlike structure can be used as nonflammable excellent filter material which is free from corrosion by any chemicals. Polytetrafluoroethylene is originally water repelling, and this filter paper does not allow any substantial amount of water to pass, but in case water and aqueous solutions are filtered, the filter material is saturated with such hydrophillic solutions as methanol, ethanol, and acetone to wet the polytetrafluoroethylene well. Then the solution is replaced with water, and by so doing the filter material passes water.

Therefore, the filter paper obtained according to the present invention can be used as the conventional filter papers almost in the same manner, and the tensile strength in the water is almost the same as in air and when the precipitate is scraped, the filter paper does not break, nor does the fiber thereof go off.

The filter paper, after having been used, is washed with such solutions as to dissolve the precipitate, is dried up, and the used filter paper can restore the original state. The filter can stand repeated uses.

The thin polytetrafluoroethylene paper obtained according to the present invention is very soft, and can be used as a substitute for deerskin for cleaning lenses and precision machines and tools, and since the tensile strength thereof is high, the usages thereof as nonwoven cloth can be considered.

What is claimed is:

1. A reinforced air-pervious sheet consisting predominantly of a polytetrafluoroethylene fibrous powder having an average fiber length of 100 to 5000 microns, an average shape factor of not less than 10, and an anisotropic expansion factor of 1.30 to 7.00 adhered by means of molten polytetrafluoroethylene to a liquid-pervious member selected from the group consisting of wire net and metallic wool web, said liquid-pervious member being capable of retaining its original form even when heated to a temperature of 270° to 380°C.

* * * * *

UNITED STATES PATENT AND TRADEMARK OFFICE
CERTIFICATE OF CORRECTION

PATENT NO. : 3,960,651
DATED : June 1, 1976
INVENTOR(S) : KOMETANI, ET AL.

It is certified that error appears in the above—identified patent and that said Letters Patent are hereby corrected as shown below:

Insert the following Foreign Application Priority Data:

-- Oct. 14, 1963  Japan ..........38-54483/63
   Nov. 13, 1963  Japan ..........38-60627/63
   June 11, 1964  Japan ..........39-32995/64
   June 17, 1964  Japan ..........39-33932/64 --

Signed and Sealed this

Tenth Day of August 1976

[SEAL]

Attest:

RUTH C. MASON
Attesting Officer

C. MARSHALL DANN
Commissioner of Patents and Trademarks